(12) United States Patent
Bayens et al.

(10) Patent No.: US 6,209,968 B1
(45) Date of Patent: Apr. 3, 2001

(54) BRAKING SYSTEM FOR MOTOR VEHICLES

(75) Inventors: Mark Bayens, Frankfurt am Main; Alfred Eckert, Mainz-Hechtsheim; Thomas Berthold, Darmstadt; Jürgen Pfeiffer, Glashütten; Christof Klesen, Modautal, all of (DE)

(73) Assignee: Continental Teves AG & Co., oHG (DE)

( * ) Notice: Subject to any disclaimer, the term of this patent is extended or adjusted under 35 U.S.C. 154(b) by 0 days.

(21) Appl. No.: 09/202,698

(22) PCT Filed: Jun. 19, 1997

(86) PCT No.: PCT/EP97/03201

§ 371 Date: Oct. 29, 1999

§ 102(e) Date: Oct. 29, 1999

(87) PCT Pub. No.: WO97/48585

PCT Pub. Date: Dec. 24, 1997

(30) Foreign Application Priority Data

Jun. 19, 1996 (DE) .............................. 196 24 376

(51) Int. Cl.⁷ .............................. B60T 8/32; B60T 7/12; B60T 13/72
(52) U.S. Cl. .................... 303/114.3; 188/356; 303/113.4; 303/119.2
(58) Field of Search ............................ 303/114.3, 113.4, 303/119.2, 119.1, 3, 155, 113.3; 91/367, 376 R, 369.1, 361; 701/70, 71, 83, 78; 188/356, 357

(56) References Cited

FOREIGN PATENT DOCUMENTS

| | | |
|---|---|---|
| 3636140 | 4/1988 | (DE) . |
| 4324205 | 1/1995 | (DE) . |
| 4409909 | 9/1995 | (DE) . |
| 19515051 | 5/1996 | (DE) . |
| 19505114 | 8/1996 | (DE) . |
| 19508822 | 9/1996 | (DE) . |
| 93/24353 | 12/1993 | (WO) . |
| 95/03196 | 2/1995 | (WO) . |
| 9717239 | * 5/1997 | (WO) . |

OTHER PUBLICATIONS

Search Report of the German Patent Office for Application 196 24 376.9.

* cited by examiner

Primary Examiner—Douglas C. Butler
(74) Attorney, Agent, or Firm—Rader, Fishman & Grauer PLL

(57) ABSTRACT

A brake system for motor vehicles with an adjustable pneumatic brake force booster includes a control valve which can be actuated by an electromagnet independently of the driver's actions. A brake pressure controller generates signals which serve to actuate the electromagnet. In order to be able to implement a quick-action, low-noise pressure regulating system at low cost, the brake pressure controller (8) is formed by connecting in parallel an electromagnetic control circuit (60) that processes the nominal brake pressure signal ($P_{nominal}$) into a first current value ($I_A$) and a regulating circuit (70) that processes a control difference ($\Delta P$) formed from the nominal brake pressure signal ($P_{nominal}$) and the actual pressure signal ($P_{actual}$) into a second current value $I_B$, with the output variable ($I_{nominal}$) of the brake pressure controller (8) being formed by adding together the two current values ($I_A$, $I_B$).

14 Claims, 5 Drawing Sheets

BRAKING SYSTEM FOR MOTOR VEHICLES

BACKGROUND OF THE INVENTION

The present invention relates to a brake system for motor vehicles with an actuating unit that is made up of a pneumatic brake force booster as well as a master brake cylinder located downstream of the booster, with such master brake cylinder having wheel brakes connected to it, wherein the control valve of the brake force booster can be actuated independently of the driver's actions by means of an electromagnet, whose armature can actuate one of the control valve's sealing seats, and with a brake pressure controller, to which a signal corresponding to a nominal brake pressure and a signal corresponding to the actual brake pressure are supplied and whose output variable corresponds to a nominal value of the electric current to be supplied to the electromagnet.

This type of brake system is known from the international patent application WO 95/03196. In the known system the output variable of the brake pressure controller, which corresponds to a nominal path of the electromagnetic armature, is compared with a signal that corresponds to the actual path of the electromagnetic armature, whereby a control difference corresponding to the result of the comparison is supplied to a position controller that affects the position of the control valve and whose output variable represents the electric current to be supplied to the electromagnet.

A less advantageous feature of the known system is the necessity of using a position controller that has to be able to realize very short cycle times and, hence, has a complicated structure and is very expensive. The displacement sensor, which is needed to sense the actuating path of the electromagnetically actuatable sealing seat, is another cost factor.

Consequently, it is the object of the present invention to propose measures, by means of which the above-mentioned system components could be eliminated and, consequently, considerable price reductions could be achieved.

SUMMARY OF THE INVENTION

According to the present invention, this object is achieved in that the brake pressure controller is formed by connecting in parallel an electromagnetic control circuit that processes the nominal brake pressure signal into a first current value and a regulating circuit that processes a control difference formed from the nominal brake pressure signal and the actual pressure signal into a second current value, with the output variable of the brake pressure controller being formed by adding together the two current values.

Additional details, characteristic features and advantages of the invention are described below on the basis of an example, with reference to the attached drawing, where corresponding elements are designated by the same reference numbers.

DETAILED DESCRIPTION OF THE DRAWINGS

Figure 1:
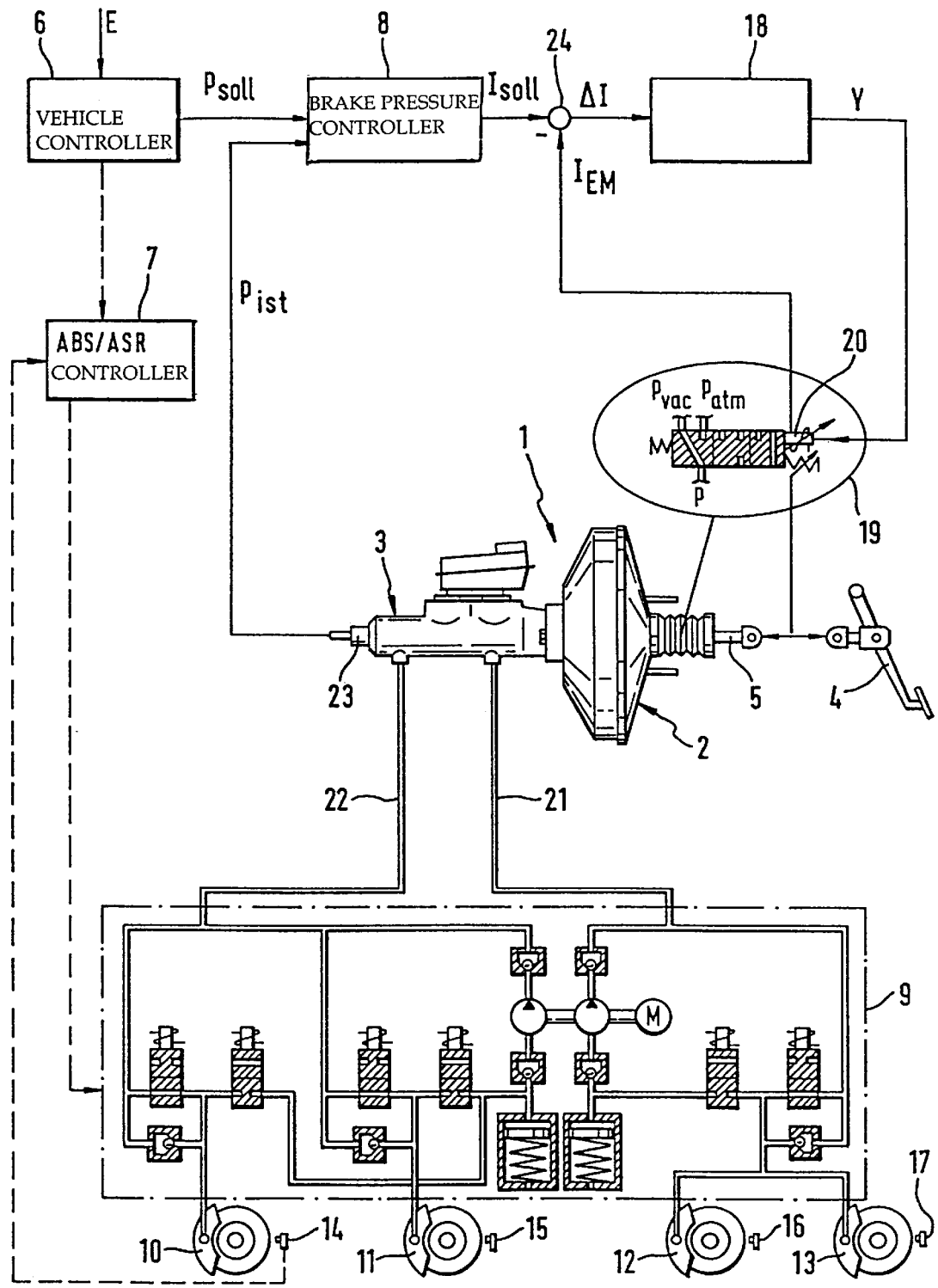
FIG. 1 shows a diagrammatic view of an embodiment of the brake system according to the present invention.

The brake system for motor vehicles according to the present invention shown in FIG. 1 basically is made up of an actuating unit 1, an electronic vehicle controller 6, wheel brakes 10, 11, 12, 13, a pressure modulator 9 disposed between wheel brakes 10 to 13 and the actuating unit 1, as well as an ABS/ASC controller 7 acting together with the vehicle controller 6, which generates control signals for the pressure modulator 9. A wheel sensor 14, 15, 16, 17 is assigned to each of the vehicle wheels—which are not shown—and its control signal corresponding to the wheel speed is supplied to the ABS/ASC controller 7. As far as the actuating unit 1 is concerned, it consists of a pneumatic brake force booster that can be activated via an actuating pedal 4, with said brake force booster preferably being a vacuum brake force booster 2 that has a downstream master brake cylinder 3, preferably a tandem master cylinder, whose pressure spaces (not shown) are connected to the pressure modulator 9 via hydraulic lines 21, 22. An actuating rod 5 is connected to the actuating pedal 4, making it possible to actuate the control valve 19 (shown merely as a diagrammatic view) which controls the pneumatic differential pressure build-up in the housing of the vacuum brake force booster 2. The control valve 19 can be actuated independently by means of an electromagnet 20.

As is further disclosed in FIG. 1, a second electronic controller (brake force controller) 8 is arranged downstream of the vehicle controller 6, to which is supplied a nominal brake force signal $P_{nominal}$ generated by the vehicle controller 6 on the basis of an input signal E provided for example by a distance sensor that is not shown as well as an actual brake force signal $P_{actual}$, which is furnished by the actuating unit 1 or a pressure sensor 23 registering the prevailing pressure in the master brake cylinder 3. The output signal $I_{nominal}$ of the brake force controller 8 corresponds to the nominal value of the electric current to be supplied to the electromagnet 20. In a comparator circuit 24 the set current value $I_{nominal}$ is compared with the actual current value $I_{EM}$ furnished to the electromagnet 20 and the result of the comparison $\Delta I$ is processed further in a current controller 18, whose output variable Y serves to actuate the electromagnet 20.

Figure 2:
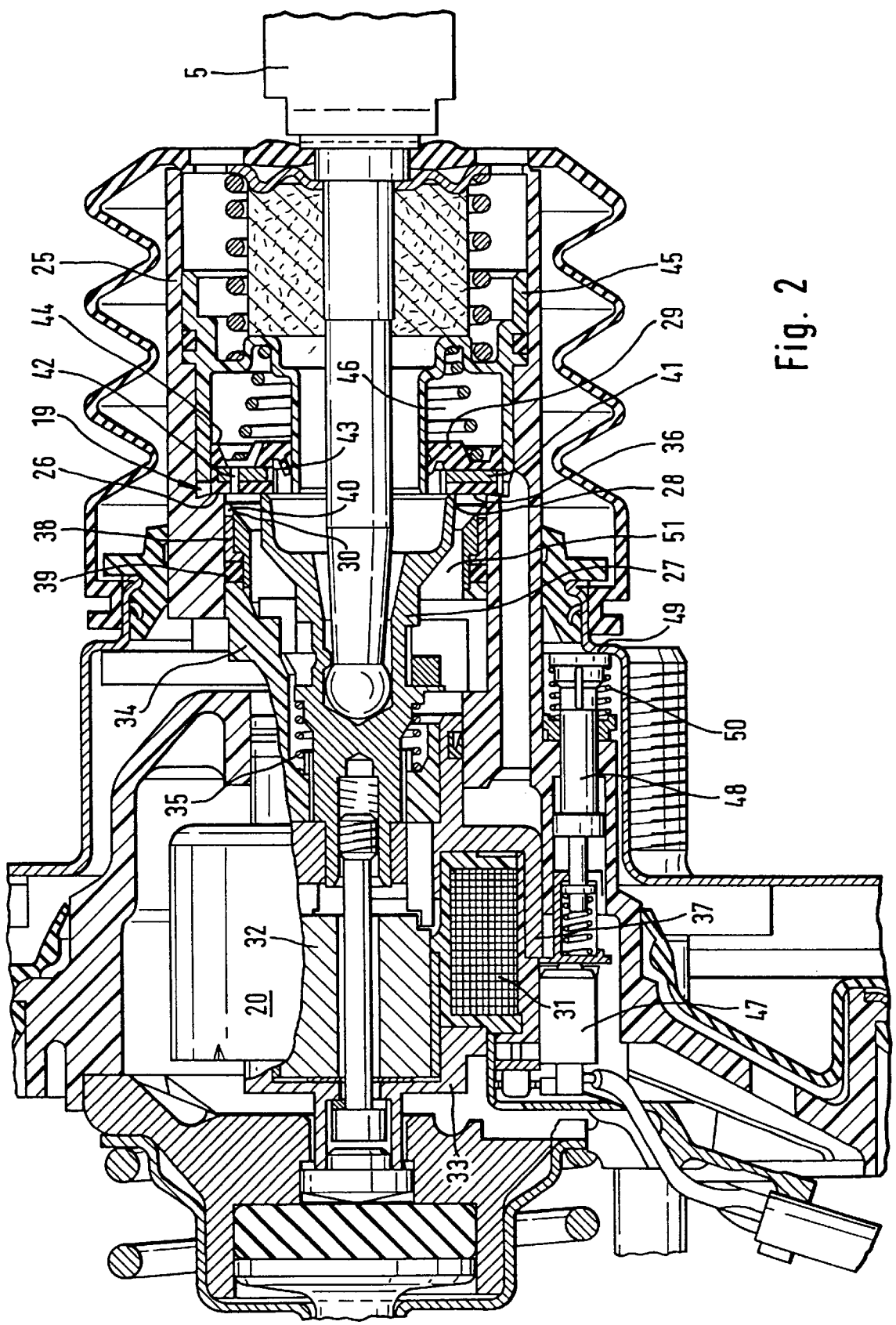
FIG. 2 shows an axial section of the control means of the pneumatic brake force booster according to FIG. 1; partially broken off.

As is disclosed particularly in FIG. 2, the control valve 19 is housed in a sealed and guided control housing 25 in the housing of the brake force booster 2 and consists of a first sealing seat 26 provided on the control housing 25, a second sealing seat 28 provided on valve piston 27 that is connected with the operating rod 5 as well as a valve body 29 cooperating with both sealing seats 26, 28.

In order to initiate an actuation of the brake force booster 2 independently of the actuating rod 5, a third sealing seat 30 is provided radially between the first (26) and the second sealing seat 28, and this third sealing seat 30, which can be actuated by the electromagnet 20, preferably is disposed in a housing 37 that is firmly connected to the valve piston 27 and, consequently, can be displaced together with the valve piston 27 in the control housing 25.

The electromagnet 20 consists of a coil 31 disposed within the housing 37 and a cylindrical armature 32 axially displaceably disposed within such coil. The armature is partially guided in a closing element 33 that seals the housing 25 and a sleeve 34 that is connected to the above-mentioned third sealing seat 30 is supported by the armature. A pressure spring 35 is interposed between the valve piston 27 and the sleeve 34 in order to hold the armature 32 in its original position, in which the third sealing seat 30 is disposed axially displaced with regard to the second sealing seat 28 provided on the valve piston 27, so that there is a gap between the third sealing seat 30 and the sealing surface 36 of the valve body 29. For this purpose a ring 38 is provided, which preferably encompasses the sleeve 34 radially and, on the one hand, is supported on the sleeve 34 by means of an elastic or compressible element 39 and, on the other hand, sits closely and axially on a stop provided on the sleeve 34, so that relative motion is possible between it and the sleeve 34. For this purpose, the width of the ring 38 is such that the distance between the edge of the ring facing the valve body 29 and the sealing surface 36 is smaller than the distance between the sealing surface 36 and the third sealing seat 30. Axial openings 40 are arranged along the above-mentioned edge of the ring. Due to the previously described design of the third sealing seat 30, a controlled pneumatic pressure compensation between the working chamber and the vacuum chamber of the brake force booster or a reduction of the force to be generated by the electromagnet 20 is made possible during the pressure reduction phase as the third sealing seat 30 travels back from the valve body 29.

As is further disclosed in the drawing, the ring-shaped sealing surface 36 cooperating with the sealing seats 26, 28, 30 is stiffened by means of a metallic reinforcing member 41 and has several axial outlets 42. Furthermore, the valve body 29 exhibits a radial inner sealing lip 43 and a second radial outer sealing lip 44, which seal off a guiding member 45 driving the valve body 29 when the valve body 29 is mounted in the control housing 25, so that a pneumatic space 46 is delimited in the control housing 25. The flow channels formed by outlets 42 and openings in the sealing surface 36 connect the pneumatic space 46 with a ring chamber 51 delimited by the sealing seats 26, 28, so that the pneumatic space 46 provided on the side of the valve body 29 facing away from the sealing surface 36 is constantly connected to the working chamber of the brake force booster and pressure compensation occurs on the valve body 29.

Accordingly, the described arrangement makes it possible to reduce the difference between the response force of the brake force booster and the restoring force acting on the valve piston in so far as that the restoring force can be increased when the response force remains constant and the response force can be decreased when the restoring force remains constant, whereby the hysteresis of the brake force booster according to the invention is improved.

Finally, the embodiment of the brake force booster according to the invention shown in the drawing includes electric switching means 47, 48, which are of particular importance in connection with braking actions where the electromagnet 20 is activated in addition to the driver's actions in order to cause full braking independently of the driver's wishes (so-called "braking assistant function"). In this connection, it is of particular importance that the switching means 47, 48 be actuated with every braking. At the same time it must be ensured that the electromagnet 20 is definitely switched off after a power-braking action. The switching means shown consist of a microswitch 47 preferably connected to the valve piston 27 or the housing 37 of the electromagnet 20 and exhibiting two switching positions as well as an actuating element 48 that triggers the microswitch 47 by means of a translatory motion, with said actuating element 48 being guided and sealed in a bore provided in the control housing 25 and cooperating with a stop on the booster housing designated by the reference number 49, which, for example, can be formed by means of a radial collar of the rearward half of the booster housing. A pressure spring 50 is interposed between the actuating element 48 and the control housing 25, so that the end of the actuating element 48 facing away from the microswitch 47 bears against the stop 49 under preload.

Figure 3:
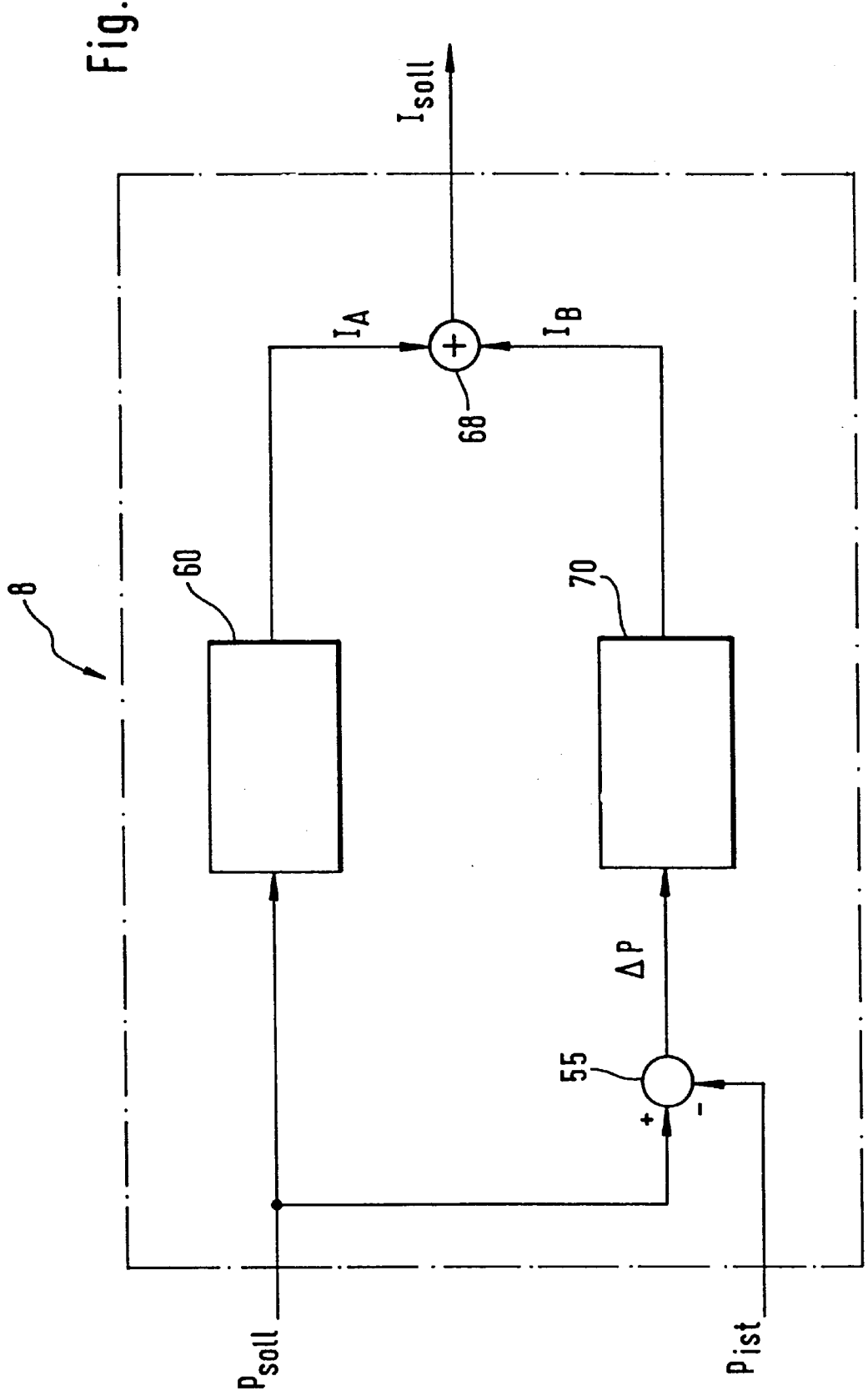
FIG. 3 shows the basic structure of the brake force controller in a simplified diagrammatic view.

The basic function of the vacuum power-brake force booster described above is known to experts and need not be explained in more detail. FIG. 3 shows the basic structure of the brake force controller 8 according to the present invention, and this drawing makes evident that the brake force controller 8 is composed by connecting in parallel an electronic control circuit 60 as well as a regulating circuit 70. Whereas the control circuit 60 processes the nominal brake force signal $P_{nominal}$ into a first current value $I_A$, a comparison circuit 55 is provided upstream of the regulating circuit 70, which forms a control difference $\Delta P$ from the nominal brake force signal $P_{nominal}$ and the actual brake force signal Pactual supplied by the pressure sensor 23 (FIG. 1), with said control difference ⊕P being processed into a second current value $I_B$ in the regulating circuit 70. The regulating circuit 70, which takes into consideration the actual pressure prevailing in the system in this way, preferably serves to eliminate errors, which can be caused, for example, by changes in the vacuum or temperature and deficiencies in the control. The two current values $I_A$ and $I_B$ are added in a downstream adder 68, whose output is processed in a limiter 73 to form the output of the brake force booster 8, with such output representing a nominal current value $I_{nominal}$ that is compared with the actual current value $I_{EM}$ supplied to the electromagnet 20 in the comparator circuit 24 mentioned above in connection with FIG. 1. The result of the comparison ⊕I is supplied to the current regulator 18 as the input variable.

Figure 4:
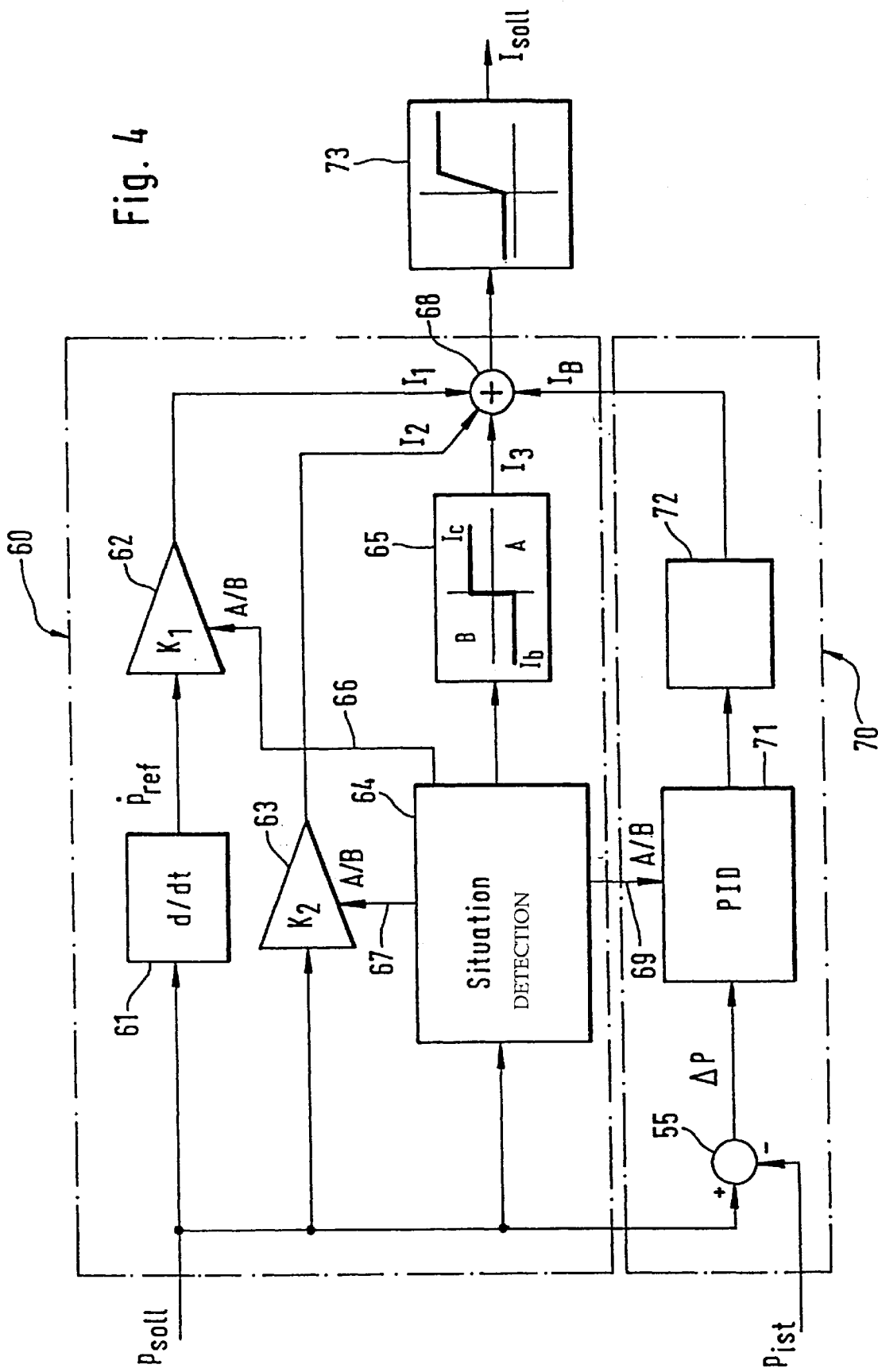
FIG. 4 is a block diagram of the brake force controller according to FIG. 3.

FIG. 4 is a block diagram of the control and regulating structures shown diagrammatically in FIG. 3. The control circuit 60 in FIG. 3 essentially consists of a differentiator 61, two boosters 62 and 63, a situation detection circuit 64 as well as a non-linear transfer element 65 with a two-point characteristic curve. The first booster 62, whose output variable represents a first partial current value $I_1$, is connected downstream of the differentiator 61, to which the signal $P_{nominal}$ that represents the nominal brake pressure value is supplied as input and which serves to form a nominal brake pressure gradient. The second booster 63, which is connected in parallel to the above-mentioned differentiator 61 and booster 62 combination and also uses as input the signal $P_{nominal}$ that represents the nominal brake pressure value, generates a second partial current value $I_2$. The nominal brake pressure signal $P_{nominal}$ is finally supplied to the situation detection circuit 64, whose output signal A/B determines the selection of either the range corresponding to a pressure build-up or that corresponding to a pressure reduction on the two-point characteristic curve of the non-linear transfer element 65, whose output variable can be made up of two values $I_b$, $I_c$ and represents a third partial current value $I_3$. Whereas the value $I_b$ corresponds to the pressure reduction phase, the value $I_c$ represents the pressure build-up phase. The sum of the partial current values $I_1$, $I_2$, and $I_3$ formed by the adder 68 corresponds to the first current value $I_A$ mentioned above in connection with FIG. 3.

The signal paths 66, 67 shown with dotted lines in FIG. 4 indicate that the amplification factors $K_1$, $K_2$ of the two boosters 62, 63 can be affected or changed in such a way by the output signal A/B of the situation detection circuit 64 that they take on two values which correspond to the pressure build-up or pressure reduction phase.

As can also be determined from FIG. 4 the regulating circuit 70 described in connection with FIG. 3 basically consists of a PID controller 71, whose actions (see signal path 69) can be influenced by the signals of the situation detection circuit 64. In this connection, the amplification factor of the proportional (P) component of the PID controller 71 can assume different values during the pressure build-up and the pressure reduction phases, whereas the integral (I) component is set to zero at every transition from the pressure build-up to the pressure reduction phase or from the pressure-reduction to the pressure build-up phase. In order to minimize noise development when actuating the electromagnet 20, it makes sense to assign a low value to the amplification factor of the P component of the PID controller 71 and to subject the P component to an additional filtration in a filter 72 arranged downstream of the PID controller 71. Furthermore, tests have shown that high-frequency $P_{nominal}$ signals require lower amplification factors of the P component. In order to achieve an even more pleasant noise level in connection with high-frequency signals, the amplification factor of the P component has to be reduced as the nominal brake pressure gradient rises. This can be implemented, for example, by means of a semi-linear adaptation function.

Figure 5:
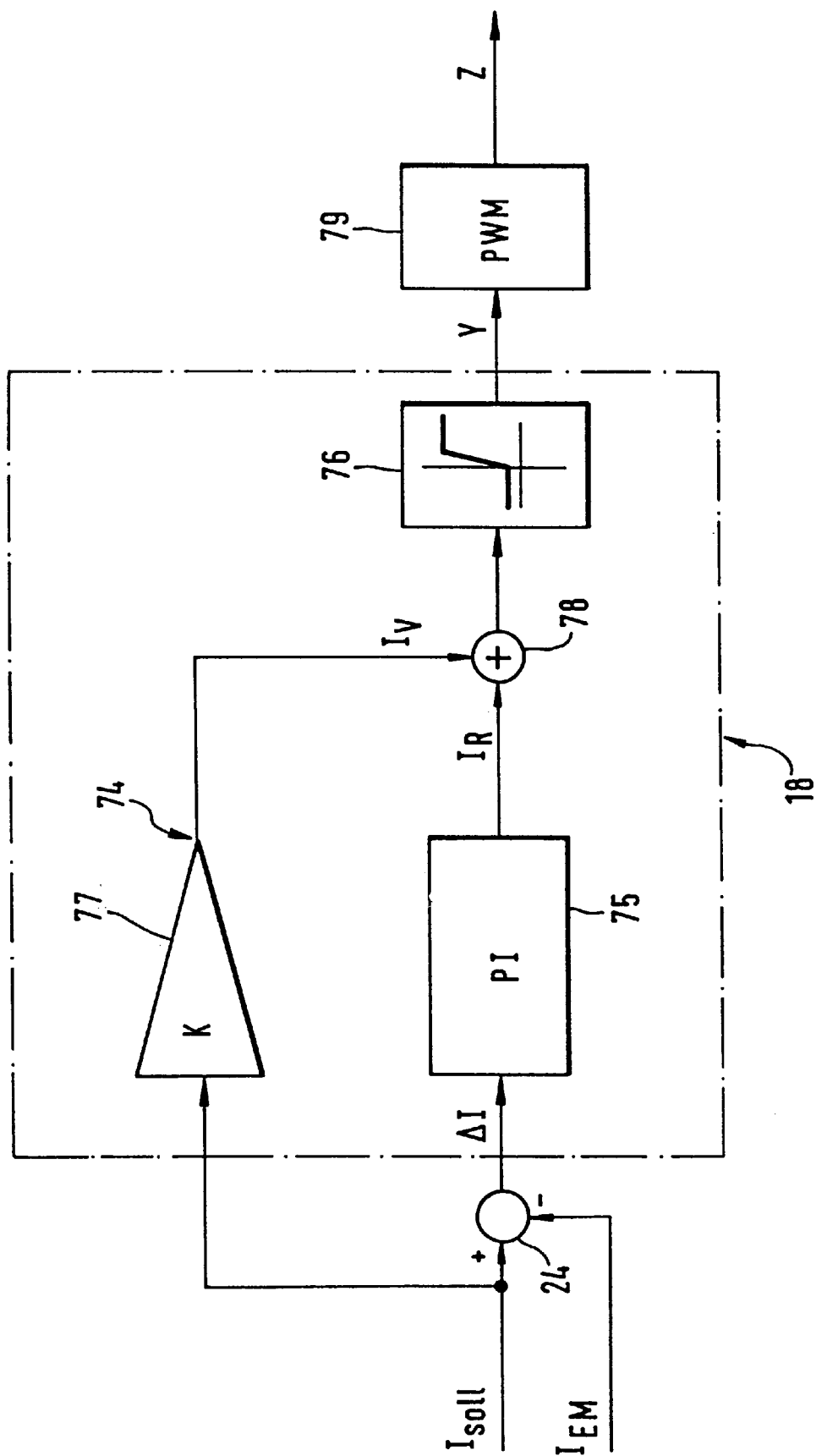
FIG. 5 is a block diagram of a current regulator arranged downstream of the brake force controller according to FIG. 3 and 4.

Finally, FIG. 5 shows the layout of the current regulator 18 (FIG. 1) arranged downstream of the pressure controller 8. The control structure illustrated basically consists of a pre-control branch 74, a proportional-plus-integral (PI) controller 75 as well as a current limiter 76. The pre-control branch 74 is made up of a booster 77, to which the output signal $I_{nominal}$ from the brake force controller 8 or the current limiter 73, which were described above, is supplied as the input variable. The PI controller 75 connected in parallel to the pre-control branch 74 processes the system deviation Δ1 formed in the comparator circuit 24 into an output signal $I_R$ which is added to the output signal $I_v$ of the booster 77 in an adder 78, with the result of such addition being supplied to the current limiter 76, whose output variable Y (see FIG. 1) is transformed into a pulse-width modulated (PWM) variable Z in a pulse-width modulation circuit 79, and such output variable is used to activate the electromagnet 20. Naturally, it would also be conceivable to arrange a filter (not shown) downstream of the PI controller 75 in the current regulator 18 described above, with such filter serving to filtrate the P component of the PI controller 75.

LIST OF REFERENCE NUMBERS

Actuating unit
Brake force booster
Master brake cylinder
Actuating pedal
Actuating rod
Vehicle controller
ABS/ASC controller
Brake pressure controller
Pressure modulator
Wheel brake
Wheel brake
Wheel brake
Wheel brake
Wheel sensor
Wheel sensor
Wheel sensor
Wheel sensor
Current regulator
Control valve
Electromagnet
Line
Line
Pressure sensor
Comparator circuit
Control housing
Sealing seat
Valve piston
Sealing seat
Sealing seat
Coil
Armature
Closing element
Sleeve
Pressure spring
Sealing surface
Housing
Ring
Element
Opening
Reinforcing member
Outlet
Sealing lip
Sealing lip
Guiding member
Space
Microswitch
Actuating element
Stop
Pressure spring
Ring chamber
PI controller
Control circuit
Differentiator
Booster
Booster
Situation detection circuit
Transfer element
Signal path
Signal path
Adder
Regulating circuit
PID controller
Filter
Current limiter
Pre-control branch
PI controller
Current limiter
Booster
Adder
PWM circuit

What is claimed is:

1. A brake system for motor vehicles with an actuating unit, comprising:
 a pneumatic brake force booster and a master brake cylinder located downstream of the booster,
 wheel brakes connected to the master cylinder, wherein the pneumatic brake force booster includes a control valve having a valve body, wherein said valve body includes a sealing seat,
 an electromagnet having an armature attached to the control valve for operating the sealing seat,
 a brake pressure controller, to which a signal corresponding to a nominal brake pressure and a signal corresponding to an actual brake pressure are supplied and whose output variable corresponds to a nominal value of an electric current to be supplied to the electromagnet, wherein the brake pressure controller is formed by connecting in parallel an electromagnetic control circuit that processes the nominal brake pressure signal into a first current value and a regulating circuit that processes a control difference between the nominal brake pressure signal and the actual pressure signal into a second current value, with the output variable of the brake pressure controller being formed by adding together the two current values.

2. A brake system according to claim 1, wherein the electronic control circuit is formed by connecting in parallel:

a differentiator, which has a first amplifier disposed downstream of it and which generates a first partial current value;

a second amplifier, which generates a second partial current value; as well as a situation detection circuit, which has a non-linear transfer element with a two-point characteristic curve disposed downstream of it, with an element generating a third partial current value;

wherein the first current value is formed by adding the partial current values.

3. A brake system according to claim 2, further including means for adjustable amplifying the current values of the boosters wherein said adjustability is a function of the state of the situation detection circuit.

4. A brake system according to claim 3, wherein the amplification factors can assume two values.

5. A brake system for motor vehicles according to claim 1, wherein the brake pressure controller includes a PID controller.

6. A brake system according to claim 5, wherein a filter is disposed downstream of the PID controller.

7. A brake system according to claim 1, wherein the sum of the two current values is supplied to a current limiter.

8. A brake system according to claim 1, wherein means for enabling a controlled pneumatic pressure compensation between a working chamber and a vacuum chamber of the brake force booster during the pressure reduction phase of the brake force booster as a third sealing seat, which is electromagnetically actuatable by the electromagnet, travels back from the valve body.

9. A brake system according to claim 1, wherein the valve body delimits a pneumatic space in a control housing which holds the control valve, wherein this pneumatic space can be pressurized with the pneumatic pressure prevailing in a working chamber of the brake force booster, and that the pneumatic space and the working chamber are connected by at least one outlet, which is provided near a sealing surface of the valve body.

10. A brake system according to claim 1, wherein the output variable of the brake pressure controller is compared with a signal, which corresponds to the actual value of the electric current to be supplied to the electromagnet, in an adder, with the control difference being furnished to a current regulator, whose output variable corresponds to the electric current to be supplied to the electromagnet.

11. A brake system according to claim 10, wherein the current regulator is designed as a PI controller.

12. A brake system according to claim 11, wherein the PI controller is connected in parallel to a booster, to which the output value of the brake force controller is supplied directly and whose output variable is added to the output variable of the PI controller, with the result of the addition being supplied to the electromagnet.

13. A brake system according to claim 11, wherein a current limiter is disposed downstream of the PI controller.

14. A brake system according to claim 10, wherein the output variable of the current regulator is converted into a pulse-width modulated value.

* * * * *

UNITED STATES PATENT AND TRADEMARK OFFICE
CERTIFICATE OF CORRECTION

PATENT NO. : 6,209,968 B1
DATED : April 3, 2001
INVENTOR(S) : Mark Bayens, Alfred Eckert, Thomas Berthold, Jurgen Pfeiffer and Christof Klesen It is certified that error appears in the above-identified patent and that said Letters Patent is hereby corrected as shown below:

<u>Column 7,</u>
Line 27, change "adjustable amplifying" to -- adjustably amplifying --.

Signed and Sealed this

Fourth Day of June, 2002

Attest:

JAMES E. ROGAN
*Attesting Officer*     *Director of the United States Patent and Trademark Office*